UNITED STATES PATENT OFFICE.

VICTOR MORITZ GOLDSCHMIDT, OF CHRISTIANIA, NORWAY, ASSIGNOR TO DET NORSKE AKTIESELSKAB FOR ELEKTROKEMISK INDUSTRI, NORSK INDUSTRI-HYPOTEKBANK, OF CHRISTIANIA, NORWAY.

MANUFACTURE OF ALUMINIUM COMPOUNDS FROM SILICATES.

1,380,552.      Specification of Letters Patent.      Patented June 7, 1921.

No Drawing.      Application filed March 19, 1917. Serial No. 155,881.

*To all whom it may concern:*

Be it known that I, VICTOR MORITZ GOLDSCHMIDT, a subject of the King of Norway, residing at Christiania, Norway, have invented certain new and useful Improvements in the Manufacture of Aluminium Compounds from Silicates; and I do hereby declare the following to be a full, clear, and exact description of the invention, such as will enable others skilled in the art to which it appertains to make and use the same.

This invention relates to the manufacture of aluminium compounds from silicates, more particularly from minerals rich in plagioclases.

According to the statements found in the technical and scientific literature pure alkali feldspar (orthoclase, albite or isomorphous mixtures of these) is not decomposable by means of mineral acids (sulfuric acid, nitric acid, hydrochloric acid) even by a very extended treatment at boiling temperature of the acid in question. Plagioclases, viz., isomorphous mixtures of albite and anorthite according to the statements in the literature are acted upon differently according to the proportion of albite to anorthite. Thus it has been considered that only the plagioclases richest in lime (with more than 75% of anorthite) are decomposed by means of mineral acids, while the plagioclases richest in soda if acted upon at all are decomposed only to a slight extent.

The plagioclases which are richest in lime (containing more than 75% of anorthite) have not been studied from a technical standpoint because they have not been found in sufficiently large and pure deposits to warrant treatment on an industrial scale. Therefore former attempts to obtain alumina by the decomposition of complex silicates containing combined aluminium, alkaline earth metals and alkali metals, with acids, have not led to practical results.

I have made the surprising discovery that plagioclases containing 40-75% anorthite, contrary to the statements of the literature can very easily be decomposed by means of mineral acids even in a dilute condition. Thus means are provided permitting the recovery of aluminium compounds from rocks containing such plagioclases. Rocks of the series labradorite-anorthosite, the main content of which is plagioclase decomposable by acids, are especially suitable for decomposition in this manner. When these rocks are decomposed by means of a mineral acid which does not react with the silica a residuum is obtained containing silica, while soluble salts of aluminium, calcium and the alkali metals are formed. From the solutions of these salts the alumina can be precipitated according to known precipitation methods.

My process is particularly adaptable in connection with rocks or minerals of the labradorite-anorthosite series, because aluminium compounds very poor in iron can be directly obtained therefrom. This is due to the fact that the iron of the labradorite-anorthosite rocks is combined in minerals such as hypersthene, diallage, almandine, and epidote which are but slightly attacked by the acids employed.

The minerals of the rock rich in iron remain undecomposed in the residuum when acids of suitable concentration are used, aluminium compounds being obtained, which are so poor in iron that they can be used directly for the manufacture of aluminium.

As an example of the acids suitable for use in connection with my process and of the concentration thereof, the following may be mentioned:

Sulfuric acid_____ 30 to 70 per cent.
Hydrochloric acid_ 10 to 30 per cent.
Nitric acid_____ 25 to 60 per cent.

The foregoing detailed description has been given for clearness of understanding and no undue limitation should be deduced therefrom, but the appended claims should be construed as broadly as permissible in view of the prior art, it being understood that my invention does not contemplate the use of hydrofluoric acid, in that such acid attacks the silica itself.

What I claim as new and desire to secure by Letters Patent of the United States is:

1. The process of producing aluminium compounds from minerals rich in plagioclases containing combined sodium, which comprises treating the said minerals with an acid not containing combined fluorin to form a solution containing aluminium salts, and recovering aluminium compounds from the solution thus formed.

2. The process of producing aluminium compounds from minerals rich in plagioclases of the labradorite-anorthosite series, which comprises treating the said minerals with mineral acid not containing combined fluorin to form a solution containing aluminium salts and recovering aluminium compounds therefrom by precipitation.

3. The process of producing aluminium compounds form minerals rich in plagioclases of the labradorite-anorthosite series, which comprises treating the said minerals with nitric acid to form a solution containing aluminium nitrate and recovering aluminium compounds therefrom by precipitation.

4. The process of producing aluminium compounds poor in iron from minerals rich in plagioclases of the labradorite-anorthosite series, which comprises treating the said minerals with a mineral acid of such concentration as to form a solution containing aluminium compounds but to leave the minerals rich in iron practically undecomposed, and recovering aluminium compounds from the solution thus formed.

5. The process of producing aluminium compounds poor in iron from minerals rich in plagioclases of the labradorite-anorthosite series, which comprises treating the said minerals with nitric acid of such concentration as to form a solution containing aluminium nitrate but to leave the minerals rich in iron practically undecomposed, and recovering aluminium compounds from the solution thus formed by precipitation.

6. The process of producing aluminium compounds from minerals rich in plagioclases of the labradorite-anorthosite series, which comprises treating the said minerals with nitric acid of about 25 to 60 per cent. concentration to form a solution containing aluminium nitrate and recovering aluminium compounds therefrom by precipitation.

In testimony that I claim the foregoing as my invention, I have signed my name in presence of two subscribing witnesses.

VICTOR MORITZ GOLDSCHMIDT.

Witnesses:
C. NORMAN,
KARL L. LEE.